United States Patent [19]
Michon et al.

[11] 4,020,447
[45] Apr. 26, 1977

[54] METHOD AND APPARATUS FOR RECORDING SEISMIC SIGNALS

[75] Inventors: Dominique Michon, Paris; Philippe Staron, Ris-Orangis, both of France

[73] Assignee: Compagnie Generale de Geophysique, Massy, France

[22] Filed: Apr. 28, 1975

[21] Appl. No.: 572,088

[30] Foreign Application Priority Data

Apr. 30, 1974  France .................... 74.15015

[52] U.S. Cl. .................. 340/7 R; 340/15.5 MC; 346/33 C
[51] Int. Cl.² .......................................... G01V 1/24
[58] Field of Search ............. 340/7 R, 15.5 MC; 346/33 C

[56] References Cited
UNITED STATES PATENTS 3,133,262  5/1964  Strange ..................... 340/7 R
3,613,071  10/1971  Quay ....................... 340/7 R
3,744,021  7/1973  Todd ....................... 340/7 R
3,887,897  6/1975  Neitzel et al. .............. 340/7 R

*Primary Examiner*—Howard A. Birmiel
*Attorney, Agent, or Firm*—Donald D. Jeffery

[57] ABSTRACT

A method and apparatus for marine seismic prospecting in which a long spacing linear array of seismic detectors is spaced from a seismic source and connected to a recording apparatus on a survey ship. A short spacing linear array of seismic detectors is also spaced from the seismic source and signals thereof supplied to suitable channels of the recording apparatus in common with some of the signals from the long spacing detector array. The principal and auxiliary signals in the common channels are distinguishable as a result of relative amplitude and time separation.

7 Claims, 7 Drawing Figures

METHOD AND APPARATUS FOR RECORDING SEISMIC SIGNALS

The present invention relates to marine seismic prospecting.

In this field there is conventially towed by a prospecting ship, a linear array of several detectors or groups of detectors. A seismic source (for example exploded wire or air cannon or steam injection nozzle) is associated with the ship for emission of a shock wave which is propagated in the water and then in underlying geological layers, the detectors collecting the waves sent back towards detector array, in particular the waves reflected by underlying reflectors.

In general, for traditional prospecting, allowing for the usual distance between the reflectors and the detector array, the detectors used are separated from one another by intervals of the order of 50 meters, the detector nearest to the source being separated from it by an interval of the order of 200 meters; there are for example 48 detectors or groups of detectors regularly spaced on the detector array, whose length is then of the order of 2500 meters; in what follows, for easier understanding, we shall denote as a long spacing array a linear array of this kind comprising a large number N of detectors.

On the other hand it appears to Applicants to be expedient to utilise in certain cases a second linear, short spacing detector array provided with detectors or groups of detectors closer to each other and closer to the ship, for example in order to obtain more precise information about the less deep reflections; for this purpose one may envisage the provision of a detector array comprising 6 detectors at 25 meters spacing, the extreme detectors being situated at 50 and 175 meters from the source; in what follows we shall denote as a short spacing array this second detector array of short length comprising a small number n of detectors fairly closely spaced.

Although the idea of joint utilisation of two linear arrays having different characteristics contains nothing to surprise a man conversant with the seismic art, a problem does however arise concerning the optimal registration of the signals of the two arrays.

The obvious solution would naturally consist of using on the one hand a principal recording unit of N channels for the N signals of the long spacing array, and on the other hand an auxiliary recording unit of $n$ channels for the $n$ signals of the short spacing array. A solution of this kind is perfectly practicable, but it requires in principle $N + n$ recording channels, which renders it prohibitive from the cost viewpoint.

By analogy with certain devices used in terrestrial seismology one may also envisage the use of the same N-channel device for recording on the one hand the N signals of the long spacing array and on the other hand the $n$ signals of the short spacing array by interposing commutation means between the recording device and the lines originating respectively from each of the two arrays. Such a solution does not however seem easy to arrange: first of all, it appears difficult to synchronise the commutations sufficiently accurately to avoid losing any useful signal; on the other hand, the commutations would inevitably produce parasitic transient phenomena on the recording.

The present invention proposes a particularly efficient and elegant solution for this problem.

According to the invention, for recording the signals proceeding from the N lines of the long spacing array and the $n$ lines of the short spacing array ($n < N$) there is used the same amplifier comprising N recording channels connected respectively to the N lines of the long spacing array, $n$ chanels of the recording device also being connected in parallel, through attenuators, to the $n$ lines of the short spacing array.

As will be seen more completely in what follows, a solution of this kind profits on the one hand from the difference in propagation time of the waves arriving at the detectors of each of the two arrays, and, on the other hand, the energy relations of the signals and of the detector noise of the two arrays.

The following description and the attached drawings will make it easier to understand how the invention may be put in practice, while showing clearly all the characteristics and advantages of the invention. In the attached drawings.

Figure 1:
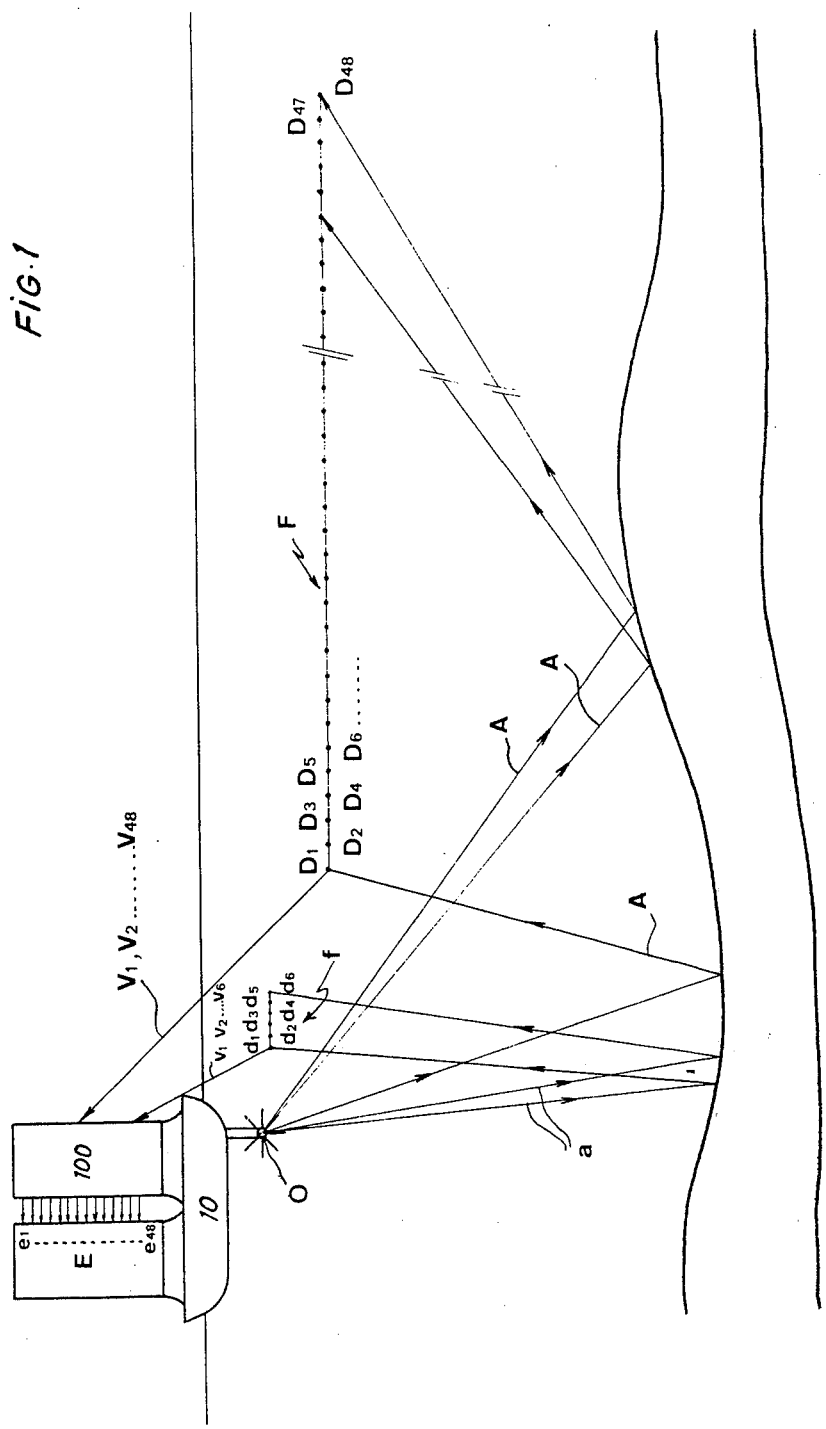
FIG. 1 shows diagrammatically a prospecting installation with a long spcing array and a short spacing in which the signals are recorded according to the invention.

There is seen in FIG. 1 the prospecting ship 10 with which is associated a seismic source O, towing a long spacing array F having 48 detectors $D_1, D_2, \ldots D_{48}$, and a short spacing array $f$ having 6 detectors $d_1, d_2, \ldots d_6$.

In all that follows the discussion will deal with that example ($N = 48, n = 6$) as far as concerns the number of detectors, but it is well understood that this choice is in no way limiting. The problem of the invention is to record on a recorder E having 48 (N) channels the signals arriving both from the 6 exit lines $v_1, v_2 \ldots v_6$ coming from $f$ and from the 48 exit lines coming from F.

In an essentially known manner, the 6 lines $v_1, v_2 \ldots v_6$, each comprising two wires, are united in a common cable going to the ship 10; likewise for the 48 lines $V_1, V_2, \ldots V_{48}$.

The invention introduces into the connecting of the different lines with the recording device E a connection and attenuation assembly 100 whose structure and function, constituting the invention, will be described below.

It is however useful first to explain the physical principles on which the invention is based.

Each detector of each of the two arrays F and $f$ receives, after the emission of a shock wave by the source O, a first signal which has followed, as it may be, a direct path in the water, a reflected path from the bottom of the water, or a refracted path at the bottom of the water, according to the depth of the water and the geological naure of the bottom. After this first signal, each detector receives a set of signals arriving from deeper and deeper reflectors, taking a longer and longer time to arrive. The figure shows the paths $a$ of the waves detected by detectors $d_1, d_2, \ldots d_6$ of the array $f$, and the paths A of the waves detected by detectors $D_1, D_2 \ldots D_{48}$ of the array F.

Allowing for the relative dimensions of the two arrays and for their positions relative to the source S, the paths $a$ (and the corresponding propagation times) are, for the same reflector, shorter than the paths A (and the corresponding propagation times).

In the same way, for an identical reflector, the paths (and the corresponding propagation times) increase from the detector nearest to the source, to the most distant detector (from $d_1$ to $d_6$ and from $D_1$ to $D_{48}$).

Finally, for each detector, the signals arriving from the various reflectors weaken rapidly, and a few seconds after the instant of firing, they are no longer identifiable, since they have an energy lower than that of the noise affecting the detector. This noise varies with different parameters (type of array, type of detector, speed of movement of the ship, distance of detectors from ship —) but it has a mean level which is substantially constant for a given detector.

FIGS. 2, 2a, 3, 3a illustrate these phenomena.

Figure 2:
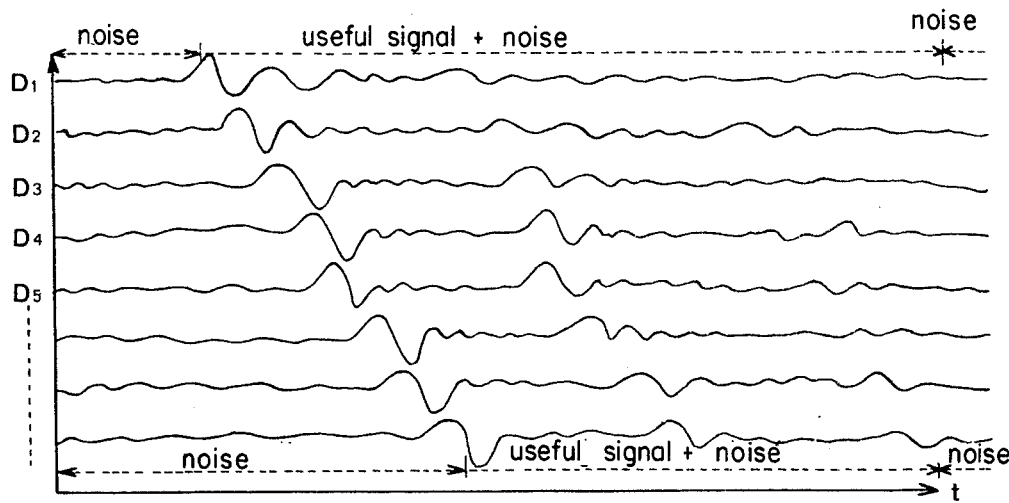
FIG. 2 shows the signals arriving at the long spacing array.
Figure 3:
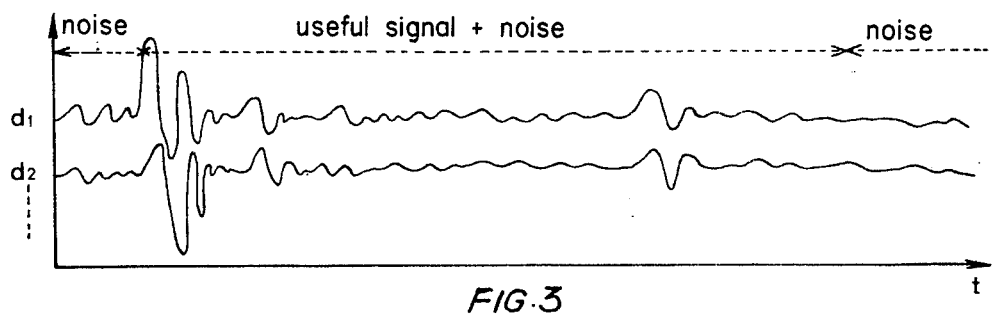
FIG. 3 shows the signals arriving at the short spacing array.

FIG. 2 and 3, which are on the same scale, show respectively, starting from the instant of firing, the variation as a function of time $t$ of the signals received by the detectors of the long spacing array, and detectors of the short spacing array.

Figure 3A:
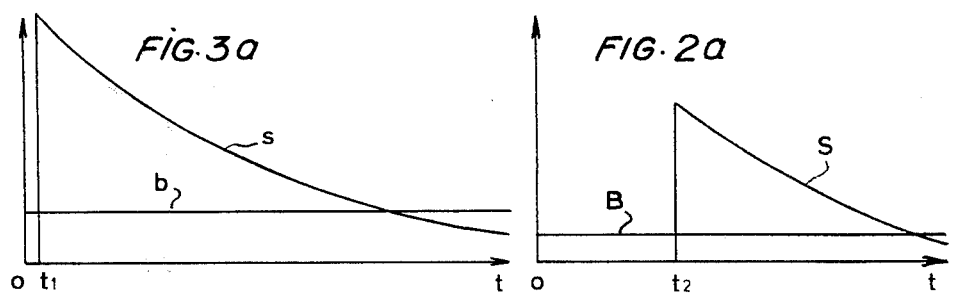
FIG. 3a shows the variation with time of the mean signal amplitude of a detector of the short spacing array.
Figure 2A:
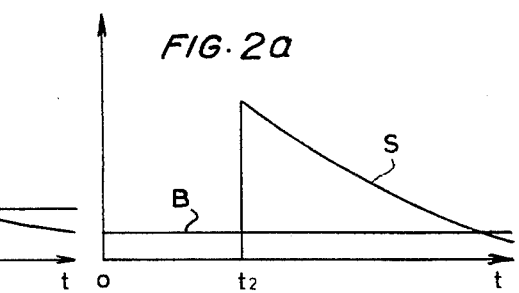
FIG. 2a shows the variation with time of the mean amplitude of the electrical signal of a detector of the long spacing array.

FIGS. 2a and 3a, which are on the same scale, show respectively for a detector of the long spacing array relatively distant from the source and for a detector of the short spacing array, the variations with time $t$, starting from the instant of firing, of the mean signal amplitude ($S,s$) relative to the noise level ($B,h$). It can be seen that for each detector there exists a zone, in which there is nothing but noise, before the first useful signal, and finally a zone in which the useful signals are very much weakened and can no loner be distinguished from the noise.

This holds good for the two arrays $f$ and F. However, for the short spacing array $f$, the initial noise zone is relatively shorter; the amplitude of the first signal is relatively stronger since the detectors $d_1$ to $d_6$ are relatively close to the source; the noise amplitude for the short spacing array $f$ is also relatively stronger, since the short spacing array is relatively closer to the ship 10, less well mechanically damped out, and the configuration of its detectors is less efficient for filtering the noise. However, an event situated at a time $t$ great enough with respect to the instant of firing has almost the same amplitude on the detectors $d_1, d_2, \ldots d_6$ of the array $f$ as on the detectors $D_1, D_2, \ldots D_{48}$ of the array F.

The present invention exploits the phenomena analyzed below.

Figure 4:
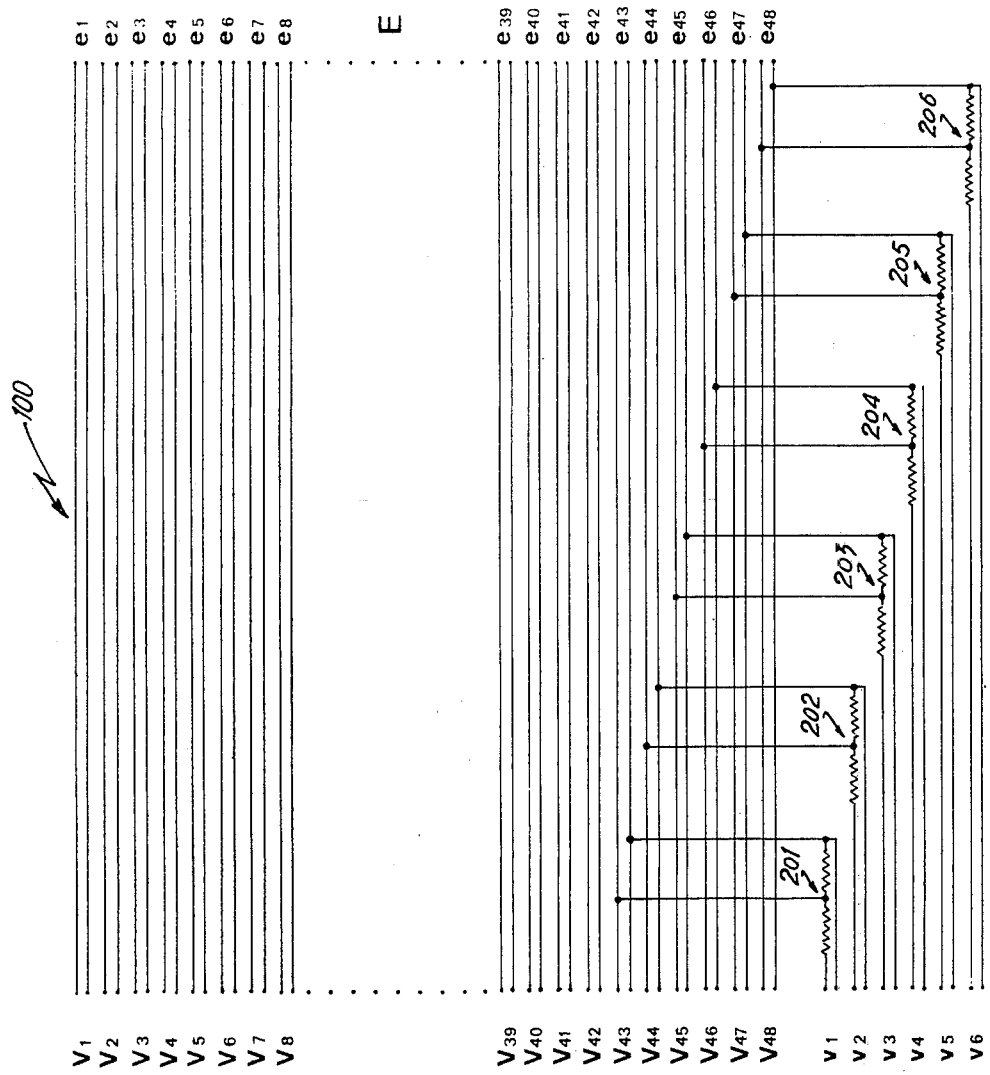
FIG. 4 shows the manner of branching the N lines of the long spacing array and the $n$ lines of the short spacing array to the recording device.

FIG. 4 shows the connection and attenuation assembly used for joining the lines $v_1, v_2, \ldots v_6$ (lines of two wires coming from the array $f$) and also the lines $V_1, V_2, \ldots V_{48}$ (coming from the array F) to the different entries $e_1, e_2, \ldots e_{48}$ of the 48-channel recorder E. The lines $v_1$ to $v_6$ are connected by way of the attenuator systems 201, 202, ... 206 to the lines $V_{43}$ to $V_{48}$.

With branching of this kind, the useful signals coming from $v_1$ to $v_6$ are recorded on the same channels ($e_{43}$ to $e_{48}$) as the signals arriving on the lines $V_{43}$ to $V_{48}$. The attenuators are chosen with an attenuation factor $k$ such that the level of the initial noise $k.b$ arriving at the recorder from a detector of the short spacing array $f$ is approximately at the level of the noise B coming from the associated detector of the long spacing array.

Figure 5:
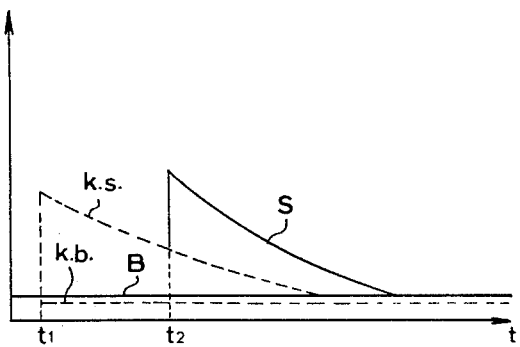
FIG. 5 shows the time variation of the mean amplitude of the signals and noise arriving from the two arrays and recorded on a common channel.

There can be seen on FIG. 5 the variation with time of the mean amplitude of signals and noise arriving at one of the entries $e_{43}$ to $e_{48}$ of the recorder E: at the instant $t_1$ (the same value as on FIG. 3a) the useful signals of the detector of the short spacing array arrive; they are clearly recorded, eing above the noise levels $k.b$ and B.; no useful signal arrives from the detector of the long spacing array. At the instant $t_2$ (the same value as on FIG. 3a) the signal S of the detector of the long spacing array begins to arrive at a level much higher than the signal $k.s$, from which it can easily be distinguished and from the noise.

It is seen that the two signals S and $k.s$ can thus be recorded together without mutual interference: in the zone $t_1$ to $t_2$ the signal $k.s$ is visible at a good signal to noise ratio, and for times greater than $t_2$, only the signal S remains visible, since the signal $k.s$ is much weaker and cannot disturb it.

In this way, very simply and exactly, recording of the signals from the two arrays is effected on the same recorder without any commutation and with practically no loss of useful information.

It is to be understood that the invention is not limited to the embodiment described above.

In particular, it is not indispensable for the signals of the short spacing array to be recorded on the same channels as those of the last detectors of the long spacing array, since it suffices that they be recorded on channels associated with detectors of the long spacing array which are sufficiently distant from the source.

On the other hand it is equivalent, within the spirit of the invention, to attenuate a first group of signals with respect to a second or to amplify the second with respect to the first.

Finally, signals originating at several seismic sources can of course be recorded.

We claim:

1. A method of marine seismic prospecting comprising the steps of:

emitting a shock wave from at least one marine seismic source means;

detecting said shock wave with a linear long spacing array comprising N detector means and with a linear short spacing array comprising a lower number $n$ of detector means, said long spacing array extending farther from said source means than said short spacing array;

producing at each detector means a signal representing said detected shock wave; and successively recording in a single recording channel first a signal coming from one of said $n$ detector means of the short spacing array and then a signal from one of said N detector means of the long spacing array, wherein each of said N signals from said long spacing detector array is recorded in a separate recording channel and whereby the N+$n$ signals are recorded on less than N+$n$ recording channels.

2. A method of marine seismic prospecting according to claim 1, in which the signals from the $n$ detector means of the short spacing array are recorded on the same $n$ channels as the $n$ out of N detector means of the long spacing array which are most distant from said source, whereby the $n+N$ signals are recorded on N recording channels.

3. A method of marine seismic prospecting according to claim 1, in which the step of successively recording in a single recording channel first a signal coming from one of said $n$ detector means of the short spacing array and then a signal from one of said N detector means of the long spacing array further comprises recording both said successively recorded signals at substantially the same noise level in said single recording channel.

4. A marine prospecting system, comprising:
at least one seismic source means;
a linear long spacing array of N detector means and a linear short spacing array of $n$ detector means, $n$ being less than N and said long spacing array extending farther from said source than said short spacing array;
means for positioning said source means and said arrays in substantially fixed mutual relation; and
recording means having at least N channels, each of N said channels being connected to a respective one of said N detector means of said long spacing array, and at least one of said N channels having further connected in parallel with the associated one of said N detector means a respective one of said $n$ detector means of said short spacing array, whereby in at least one channel of said recording means signals both from one of N detector means and from one of said $n$ detector means are recorded.

5. A marine prospecting system according to claim 4 further including, in each recording channel having parallel-connected long spacing array and short spacing array detector means, means for equalizing the noise levels of signals from said parallel-connected detector means.

6. A marine prospecting system according to claim 5, wherein said noise equalizing means comprises attenuator means in series with each said short spacing array detecting means that is parallel-connected with a long spacing array detecting means.

7. A marine prospecting system according to claim 4, wherein each of said $n$ detector means of the short spacing array is connected in parallel with a respective one of the $n$ detector means in the N detector means long spacing array which are most distant from said source means.

\* \* \* \* \*